(12) United States Patent
Namou et al.

(10) Patent No.: US 9,190,856 B2
(45) Date of Patent: Nov. 17, 2015

(54) SYSTEMS AND METHODS FOR CHARGING MULTIPLE VEHICLE RECHARGEABLE ENERGY STORAGE SYSTEMS

(71) Applicant: GM GLOBAL TECHNOLOGY OPERATIONS LLC, Detroit, MI (US)

(72) Inventors: Andrew J. Namou, West Bloomfield, MI (US); Todd F. Mackintosh, Macomb, MI (US); Gregory G. Cesiel, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 277 days.

(21) Appl. No.: 13/769,072

(22) Filed: Feb. 15, 2013

(65) Prior Publication Data

US 2014/0232337 A1   Aug. 21, 2014

(51) Int. Cl.
*H02J 7/00* (2006.01)

(52) U.S. Cl.
CPC ............. *H02J 7/0027* (2013.01); *H02J 7/007* (2013.01); *Y02T 10/7055* (2013.01)

(58) Field of Classification Search
CPC ....... H02J 7/0027; H02J 13/0006; H02J 1/14; H02J 2007/0059; H02J 2007/0067; H02J 3/383; H02J 7/0019; H02J 7/007; H02J 7/0073; Y02T 10/7055
See application file for complete search history.

(56) References Cited

U.S. PATENT DOCUMENTS

| 2007/0300135 | A1* | 12/2007 | Kamiya | ........................ 714/781 |
| 2013/0134936 | A1* | 5/2013 | Kaneyasu et al. | ............. 320/109 |
| 2013/0314037 | A1* | 11/2013 | Caffy | ............................ 320/109 |

FOREIGN PATENT DOCUMENTS

CN    102255350    11/2011

OTHER PUBLICATIONS

Concise Explanation of Relevance of CN102255350.

\* cited by examiner

*Primary Examiner* — Nha Nguyen
(74) *Attorney, Agent, or Firm* — Phillips Ryther & Winchester; John P. Davis

(57) ABSTRACT

Systems and methods for charging multiple rechargeable energy storage systems ("RESSs") included in one or more vehicles using a single charging system are presented. In some embodiments, a method for charging one or more RESSs may include receiving an indication that one or more charging ports of a plurality of charging ports included in a charging system have RESSs coupled thereto. Based on the indication, a charging map may be generated. One or more charging parameters may be determined based on the generated charging map. Based on the charging parameters, a switching mechanism included in the charging system may be selectively actuated to provide electrical power from a charging power source to charging ports coupled to RESSs.

13 Claims, 5 Drawing Sheets

SYSTEMS AND METHODS FOR CHARGING MULTIPLE VEHICLE RECHARGEABLE ENERGY STORAGE SYSTEMS

TECHNICAL FIELD

This disclosure relates to systems and methods for charging rechargeable energy storage systems included in a vehicle. More specifically, the systems and methods of the present disclosure relate to charging multiple rechargeable energy storage systems using a single charging system.

BACKGROUND

Passenger vehicles often include electric batteries for operating features of a vehicle's electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a high voltage ("HV") battery system (e.g., a 360V HV battery system) may be used to power electric drivetrain components of the vehicle (e.g., electric drive motors and the like). For example, an HV rechargeable energy storage system ("RESS") included in a vehicle may be used to power electric drivetrain components of the vehicle.

A RESS included in a vehicle may be recharged by electrically coupling the RESS to a charging port associated with a charging system configured to provide electric energy to the RESS. In conventional charging systems, a single vehicle may be coupled to the charging system at any given time. To charge multiple vehicles simultaneously, multiple charging systems may be needed (e.g., multiple charging transformers). For example, to charge three vehicles including RESSs simultaneously, three charging stations (e.g., three charging transformers) may be needed. The additional costs and inconveniences associated with multiple charging systems may be burdensome for a charging location that desires to have the capability of charging multiple vehicles simultaneously, thereby limiting the proliferation of such locations and adoption of vehicles including RESSs.

SUMMARY

Systems and methods are presented for charging multiple RESSs included in one or more vehicles simultaneously using a single charging system. In certain embodiments, a system for charging one or more RESSs may include a charging power source and a plurality of charging ports configured to interface with the one or more RESSs. The system may further include switching mechanism configured to selectively couple the charging power source to the plurality of charging ports. A charging control system may be configured to generate a charging map indicating which charging ports of the plurality of charging ports are coupled to RESSs. The charging control system may be further configured to determine one or more charging parameters based on the charging map, and selectively actuate the switching mechanism based on the one or more charging parameters to provide electrical power from the charging power source to charging ports coupled to RESSs. In this manner, multiple RESSs may be charged by the system during a charging period.

In further embodiments, a method for charging one or more RESSs may include receiving an indication that one or more charging ports of a plurality of charging ports included in a charging system have RESSs coupled thereto. Based on the indication, a charging map may be generated. One or more charging parameters may be determined based on the generated charging map. Based on the charging parameters, a switching mechanism included in the charging system may be selectively actuated to provide electrical power from a charging power source to charging ports coupled to RESSs.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

The systems and methods disclosed herein may allow for simultaneous charging of a plurality of RESSs included in one or more vehicles using a single charging system. Each of the plurality of RESSs/vehicles may be coupled to a discrete charging port associated with the charging system. In certain embodiments, the RESSs/vehicles may be coupled to the charging ports by coupling a charging connector associated with the charging port to a receptacle included in the vehicle (e.g., using a SAE J1772 standard connector or the like). The charging ports may be coupled to a charging control system that in turn is coupled to a charging system (e.g., a charging transformer system or the like). The charging control system may be configured to selectively provide electrical power from the charging system to the charging ports using a switching mechanism, thereby charging the RESSs coupled to the charging ports.

Figure 1:
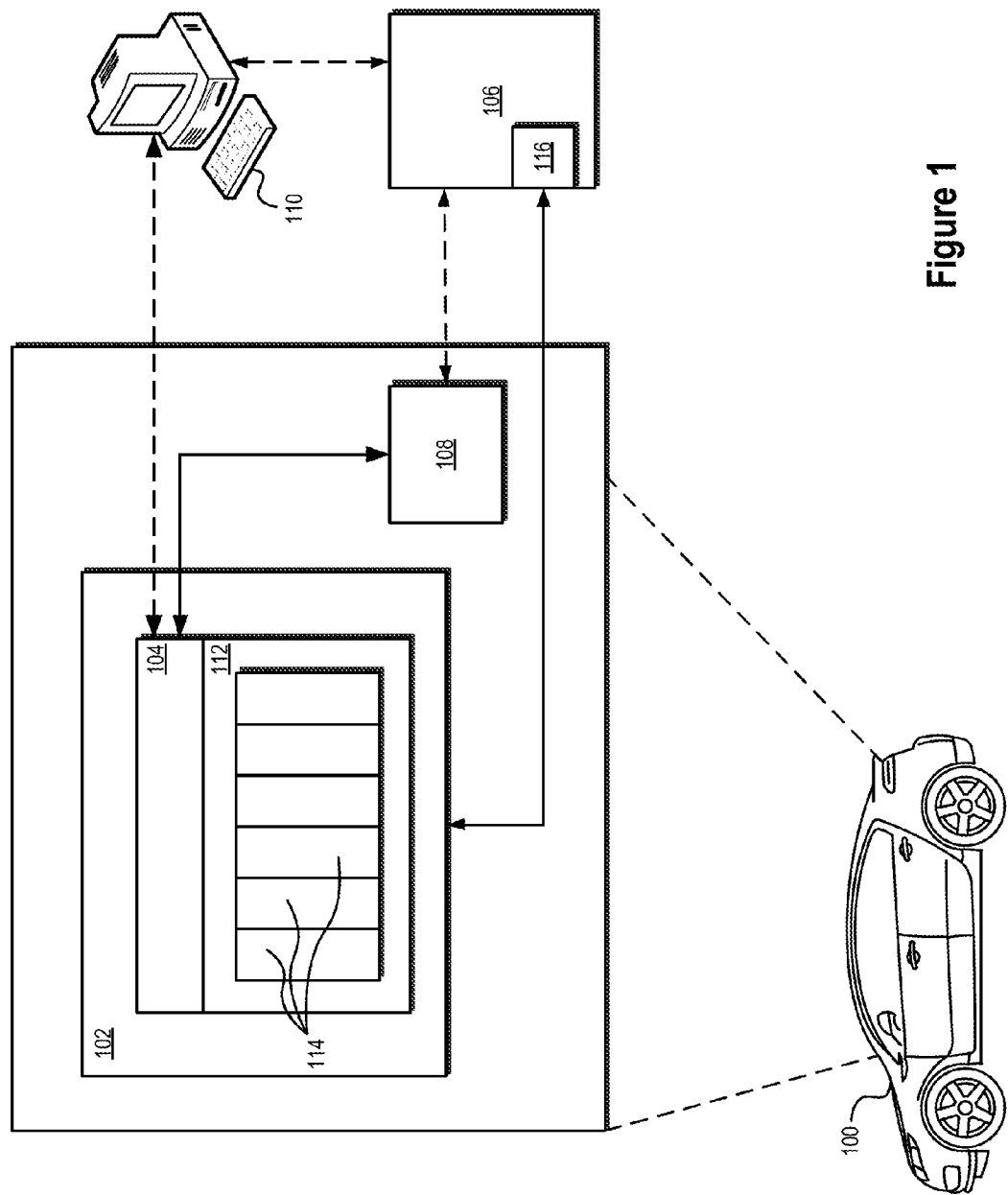
FIG. 1 illustrates an exemplary system for charging an RESS in a vehicle consistent with embodiments disclosed herein.

FIG. 1 illustrates an exemplary system for charging an RESS 102 in a vehicle 100 consistent with embodiments disclosed herein. The vehicle 100 may be a motor vehicle, a marine vehicle, an aircraft, and/or any other type of vehicle, and may include an internal combustion engine ("ICE"), an electric motor drivetrain, a hybrid engine drivetrain, an FC drivetrain, and/or any other type of drivetrain suitable for incorporating the systems and methods disclosed herein.

The vehicle 100 may include a RESS 102 that, in certain embodiments, may be a rechargeable HV battery system. The RESS 102 may be used to power electric drivetrain components (e.g., as in an electric or hybrid power system). In further embodiments, the RESS 102 may be a low voltage battery (e.g., a lead-acid 12V automotive battery) and may be configured to supply electric energy to a variety of vehicle 100 systems including, for example, vehicle starter systems (e.g., a starter motor), lighting systems, ignition systems, and/or the like.

The RESS 102 may include a control system 104. The control system 104 may be configured to monitor and control certain operations of the RESS 102. For example, the control system 104 may be configured to monitor and control charging and discharging operations of the RESS 102. In certain embodiments, the control system 104 may be communicatively coupled with one or more sensors (e.g., voltage sensors, current sensors, and/or the like, etc.) and/or other systems configured to enable the control system 104 to monitor and control operations of the RESS 102. For example, one or more sensors may provide the control system 104 with information used to estimate a state-of-charge ("SOC"), estimate a resistance, measure a current, and/or measure voltage of the RESS 102 and/or its constituent components. The control system 104 may further be configured to provide information to and/or receive information from other systems included in the vehicle 100. For example, the battery control system 104 may be communicatively coupled with an internal vehicle computer system 108 and/or an external computer system 110 (e.g., via a wireless telecommunications system or the like). In certain embodiments, the control system 104 may be configured, at least in part, to provide information regarding the RESS 102 to a user of the vehicle 100, vehicle computer system 108, and/or external computer system 110. Such information may include, for example, RESS SOC information, vehicle operating time information, RESS operating temperature information, and/or any other information regarding the RESS 102.

The RESS 102 may include one or more packs 112 suitably sized to provide electrical power to the vehicle 100. Each pack 112 may include one or more subdivisions 114. The subdivisions 114 may comprise one or more battery cells utilizing any suitable battery technology or combination thereof. Suitable battery technologies may include, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other suitable battery technologies.

In certain embodiments, one or more electrical parameters may be provided to control system 104, vehicle computer system 108, and/or external computer system 110 by one or more sensors (not shown) associated with RESS 102. In certain embodiments, information provided by one or more sensors (e.g., electrical parameters) may be utilized by control system 104, vehicle computer system 108, and/or external computer system 110, and/or any other system to monitor and control operations of the RESS 102, including charging and discharging operations.

As illustrated in FIG. 1, the RESS 102 may be coupled to a charging system 106 to facilitate charging of the RESS 102. In some embodiments, a charging port (not shown) may be disposed between the RESS 102 and the charging system 106. In certain embodiments, a SAEJ1772 standard connector and/or any other suitable connector system may be utilized to facilitate the coupling of the RESS 102 to the charging system 106. As used herein, when a vehicle 100 is coupled to a charging port, an RESS 102 included in the vehicle 100 may also be coupled to the charging port.

The charging system 106 may include charging control electronics 116. In some embodiments, the charging control electronics 116 may be configured to monitor and control, at least in part, charging operations performed by charging system 106. In certain embodiments, when RESS 102 is coupled to the charging system 106, charging control electronics 116 may be communicatively coupled with control system 104, vehicle computer system 108, external computer system 110, and/or any other system, and may monitor and control operations of the RESS 102 (e.g., charging and discharging operations) alone or in combination with any other communicatively coupled system. For example, control system 104 may provide an indication of a SOC of RESS 102 to charging control electronics 116, which may cause charging system 106 to terminate charging operations of RESS 102 when the SOC reaches a threshold level indicating that the RESS 102 is sufficiently charged Alternatively, control system 104 may stop drawing power from charging system 106 when RESS 102 reaches the threshold level.

In some embodiments, the charging control electronics 116 may be further configured to selectively provide electrical power from the charging system 106 to the RESS 102. For example, as discussed in more detail below in reference to FIG. 2, in embodiments where the charging system 106 includes a plurality of charging ports configured to interface with a plurality of RESSs, charging control electronics 116 may utilize a switching mechanism configured to selectively provide electrical power from charging system 106 to each of the plurality of RESSs coupled to the plurality of charging ports.

Figure 2:
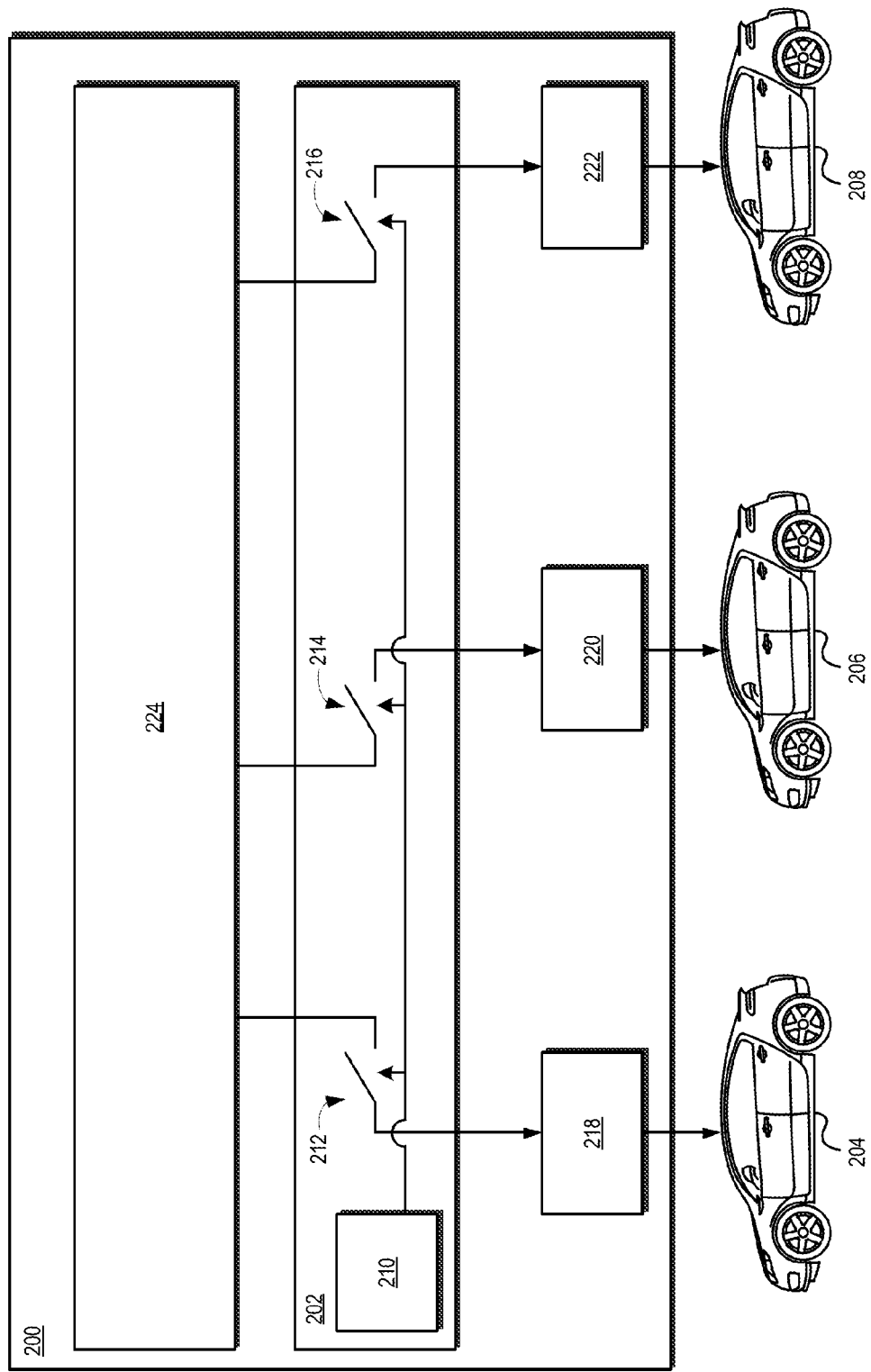
FIG. 2 illustrates an exemplary charging system for simultaneously charging multiple RESSs included in multiple vehicles consistent with embodiments disclosed herein.

FIG. 2 illustrates an exemplary charging system 200 for simultaneously charging multiple RESSs included in multiple vehicles 204-208 consistent with embodiments disclosed herein. RESSs included each vehicle 204-208 may be coupled to an associated charging port 218-222. For example, as illustrated, an RESS included in vehicle 204 may be coupled to charging port 218, an RESS included in vehicle 206 may be coupled to charging port 220, and an RESS included in vehicle 208 may be coupled to charging port 222. In this manner, a charging system 200 capable of charging n RESSs would thus include n charging ports. RESSs included in vehicles 204-208 may be coupled to charging ports 218-222 using, for example, a SAEJ1772 standard connector and/or any other suitable connector system.

Charging ports 218-222 may be coupled to a charging power source 224 via charging control system 202. Charging power source 224 may be configured to provide electrical energy used to charge RESSs included in vehicles 204-208. In certain embodiments, charging power source 224 may include one or more power transformers configured to step up and/or step down electrical power to levels appropriate for charging RESSs before providing the electrical power to RESSs during charging operations.

Charging control system 202 may be configured to monitor and control electrical power provided by charging power source 224 during charging of RESSs coupled to any of charging ports 218-222. The charging control system 202 may include control electronics 210 configured to selectively provide electrical power from charging power source 224 to each of the plurality of RESSs coupled to the plurality of charging ports. In certain embodiments, control electronics 210 may be coupled to selectively actuated switches 212-216 configured to selectively couple charging power source 224 to charging ports 218-222. For example, switch 212 may be configured to selectively couple charging power source 224 to charging port 218, switch 214 may be configured to selectively couple charging power source 224 to charging port 220, and switch 216 may be configured to selectively couple charging power source 224 to charging port 222. Switches 212-216 may comprise any suitable switching mechanism and/or technologies, including IGBT, MOSFET, and the like.

In certain embodiments, when a vehicle (e.g., one of vehicles 204-208) is coupled to any of charging ports 218-222, an indication may be provided to charging control system 202, control electronics 210, and/or any other suitable system that the vehicle is coupled to a particular charging port. For example, when vehicle 204 is coupled to charging port 218, an indication may be provided to charging control system 202 and/or control electronics 210 that vehicle 204 is coupled to charging port 218. Similarly, when vehicle 206 is coupled to charging port 220, and indication may be provided to charging control system 202 and/or control electronics 210 that vehicle 206 is coupled to charging port 220. Based on received indications, charging control system 202 and/or control electronics 210 may determine how many vehicles are coupled to charging ports 218-222. Further, charging control system 202 may determine to which of charging ports 218-222 the vehicles are coupled. Based on this information, charging control system 202 and/or control electronics 210 may monitor and/or control charging operations performed by charging system 200.

Charging control system 202 and/or control electronics 210 may generate a charging map indicating how many vehicles are coupled to charging ports 218-222 and to which charging ports of charging ports 218-222 the vehicles are coupled. In some embodiments, the charging map may be embodied as a string of bits indicating which charging ports of charging ports 218-222 have connected vehicles 204-208. Asserted bits of the string may indicate which charging ports 218-222 have connected vehicles 204-208. For example, if vehicle 204 is coupled to charging port 218 and vehicle 208 is coupled to charging port 222, the charging map may be represented as [1 0 1]. Similarly, if vehicle 206 is coupled to charging port 220 and vehicle 208 is coupled to charging port 220, the charging map be represented as [0 1 1]. Although embodiments of the charging map disclosed herein may utilize a string of bits to represent connectivity of charging ports 218-222, further embodiments may utilize state space representation.

When a vehicle is coupled to and/or uncoupled from any of charging ports 218-222, the charging map may be updated. In this manner, the charging map may be utilized to determine which of charging ports 218-222 are connected to vehicles at any given time. Based on the charging map, charging control system 202 and/or control electronics 210 may monitor and/or control charging operations performed by charging system 200.

In certain embodiments, control electronics 210 may be configured to actuate switches 212-216 based on the charging map so that vehicles connected to charging ports 218-222 are recharged by charging power source 224. In some embodiments, control electronics 210 may be configured to actuate switches 212-216 based on one or more charging parameters based on the charging map. For example, when vehicle 204 is coupled to charging port 218 and vehicle 208 is coupled to charging port 222, control electronics 210 may actuate switches 212 and 216 such that electrical power from charging power source 224 is provided to vehicles 204 and 208 in an alternating fashion. That is, switches 212 and 216 may each be actuated to have a 50% duty cycle. In this manner, switches 212-214 may be actuated by control electronics such that power provided by charging power source 224 during a given period is distributed and/or cycled between any vehicles connected to charging ports 218-222.

Control electronics 210 may further be configured to adjust an actuation frequency of switches 212-216 and an actuation phase of switches 212-216 so that electrical power provided by charging power source 224 during a given period is distributed (e.g., cycled) among vehicles connected to charging ports 218-222.

The control electronics 210 may be configured to adjust the actuation frequency, duty cycle, and/or phase of switches 212-216 based on changes to the charging map. When a vehicle 204-208 is added and/or removed from any of charging ports 218-222, the charging map may be updated and the control electronics 210 may actuate the switches 212-216 such that the added and/or removed vehicles 204-208 are charged by power source 224. For example, if vehicle 204 and 208 are coupled to charging ports 218 and 222, respectively, and vehicle 206 is then coupled to charging port 220, control electronics 210 may change from actuating switches 212 and 216 in an alternating fashion to actuating switches 212, 214, and 216 in a cyclical fashion such that all of vehicles 204-208 are charging by charging power source 224. In this manner, vehicles 204-208 may be coupled and/or uncoupled to charging ports 218-220, and control electronics 210 may adjust its actuation of switches 212-216 based on such changes so that all coupled vehicles 204-208 are charged by charging power source 224. In certain embodiments, when a vehicle is fully charged, the charging map may be updated in a manner similar to that when a vehicle is removed from the charging system, as the fully charged vehicle does not require further charging by the charging system.

In certain embodiments, instead of or in addition to actuating switches 212-216 based on the charging map, the control electronics 210 may issue one or more control signals to charging ports 218-222. The control signals may be configured to actuate a charging mechanism included in the charging ports 218-222 based on the charging map. In some embodiments, the control electronics 210 may issue one or more control signals to charging ports 218-222 so that vehicles connected to charging ports 218-222 are recharged by charging power source 224. For example, when charging ports 218-222 include a SAEJ1772 connection system, the control electronics 210 may issue control pilot signals to charging ports 218-222 based on the charging map so that vehicles connected to the charging ports 218-222 are recharged by charging power source 224 consistent with the systems and methods disclosed herein.

Figure 3:
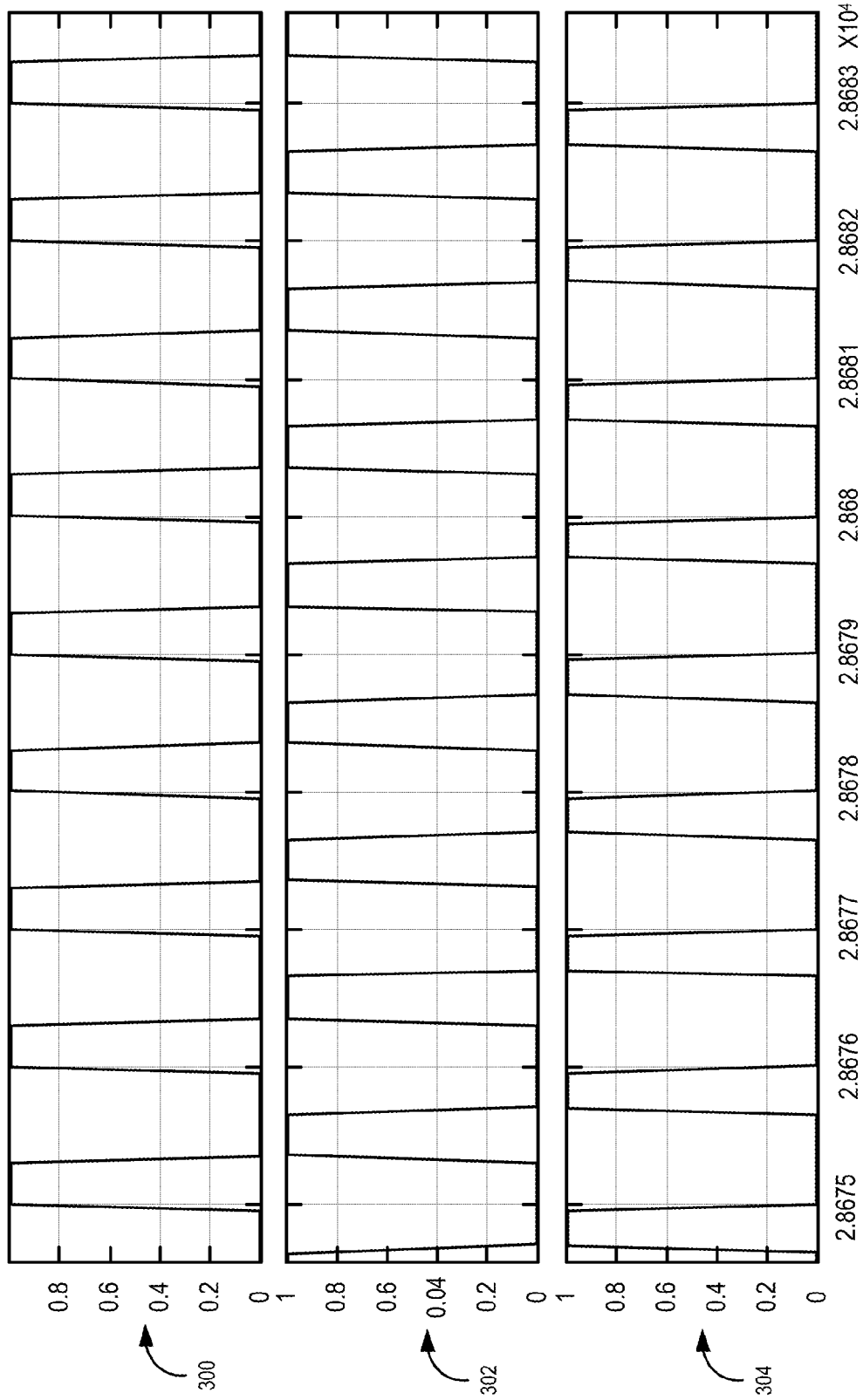
FIG. 3 illustrates graphs showing exemplary charging currents over time provided to three RESSs by a charging system consistent with embodiments disclosed herein.

FIG. 3 illustrates graphs 300-304 showing exemplary charging currents over time provided to three RESSs by a charging system consistent with embodiments disclosed herein. As discussed above in reference to FIG. 2, consistent with embodiments disclosed herein, control electronics included in a charging control system may be configured to selectively actuate one or more switches to alternate and/or cycle electrical power provided by a charging power source to one or more RESSs coupled to a charging system (e.g., by adjusting the actuation frequency, duty cycle, and/or phase of the switches).

Each graph 300-304 illustrated in FIG. 3 shows an exemplary charging current signal provided to one of three RESSs coupled to a charging system during a charging operation. As illustrated, at any given time, one of the RESSs coupled to a charging system may be provided with a charging current. Charging currents may be cycled and/or alternated between the RESSs such that all three RESSs are charged by charging system 100. In this manner, a plurality of RESSs may be may be charged using a single charging system.

Figure 4:
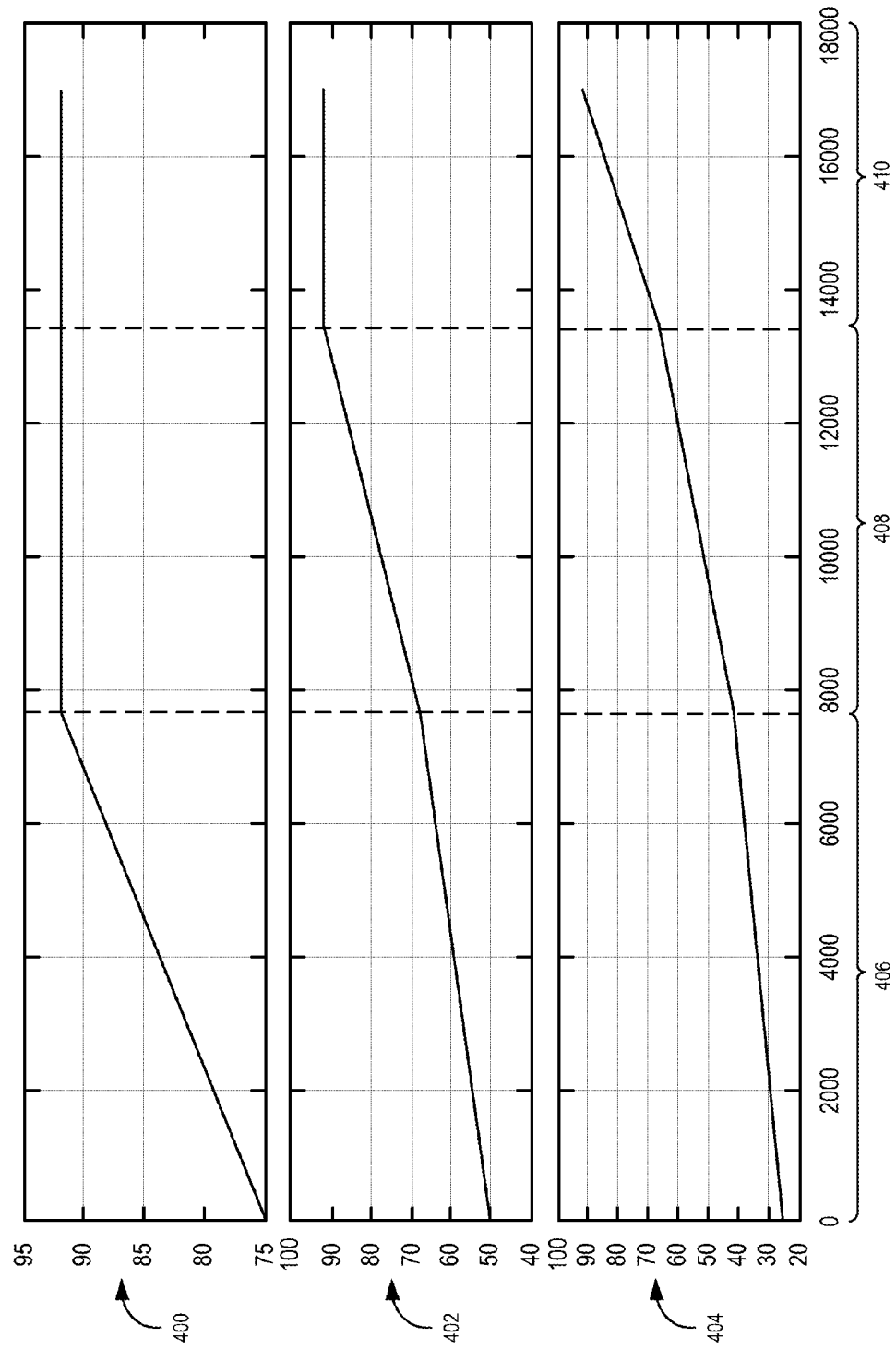
FIG. 4 illustrates graphs showing exemplary state-of-charge ("SOC") levels over time of three RESSs during a charging period consistent with embodiments disclosed herein.

FIG. 4 illustrates graphs 400-404 showing exemplary SOC levels over time of three RESSs during a charging period consistent with embodiments disclosed herein. As discussed above, systems and methods disclosed herein may allow a plurality of RESSs to be charged using a single charging system including a charging control system implementing a switching mechanism. During a first period 406, the three RESSs associated with graphs 400-404 may all be charging. That is, during the first period 406, the charging control system may selectively switch a charging power source between the three RESSs. Accordingly, the RESSs associated with graphs 400-404 may be provided with similar charging current levels during the first period 406.

At the end of the first period 406, the RESSs associated with graph 400 may be fully charged. Accordingly, at the start of the second period 408, the charging system may stop charging the RESSs associated with graph 400 but continue charging the RESSs associated with graphs 402 and 404. That is, during the second period 408, the charging control system may selectively switch a charging power source between the RESSs associated with graphs 402 and 404. As illustrated, when only two RESSs may be charging during the second period 408, higher charging current levels may be provided to the two RESSs during the second period 408 than what were provided during the first period 406.

At the end of the second period 408, the RESSs associated with graphs 400 and 402 may be fully charged. Accordingly, at the start of the third period 410, the charging system may stop charging the RESSs associated with graphs 400 and 402 but continue charging the RESS associated with graph 404. That is, during the third period 410, the charging control system may switch the charging power source to charge the RESS associated with graph 404 during the duration of the third period 410. As only one RESS may be charging during the third period 410, the RESS may be charged at a relatively fast rate.

Figure 5:
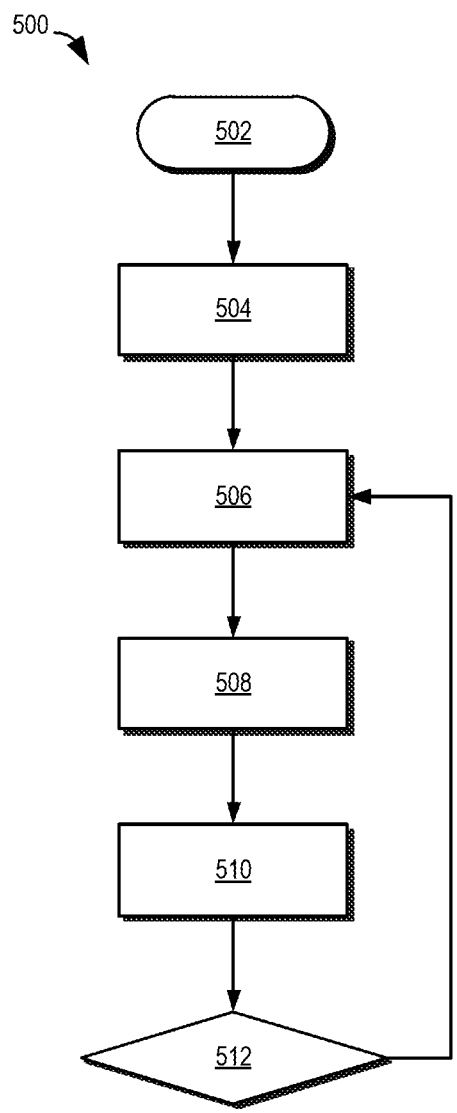
FIG. 5 illustrates a flow chart of an example of a method for charging one or more RESSs consistent with embodiments disclosed herein.

FIG. 5 illustrates a flow chart of an example of a method 500 for charging one or more RESSs consistent with embodiments disclosed herein. In certain embodiments, the illustrated method 500 may be performed using, at least in part, a charging system, a charging power source, a charging control system, control electronics, one or more selectively actuated switches, and/or one or more charging ports as disclosed herein. In further embodiments, any other suitable system or systems may be utilized.

At 502, the method may be initiated. In certain embodiments, method 500 may be initiated upon startup of a charging system, although other initiation times are also contemplated. At startup of the charging system, one or more vehicles may be already coupled to the charging system. In further circumstances, one or more vehicles may be coupled to the charging system after startup of the charging system.

At 504, a charging control system included in the charging system may determine a number of vehicles coupled to the charging system and identify one or more charging ports to which the vehicles are coupled. In certain embodiments, this determination may be made based, at least in part, on information communicated to the charging system from a vehicle and/or any other system when a vehicle is coupled to a charging port and/or the charging system. The charging control system may further determine which, if any, of the charging ports are not coupled to any vehicles.

Based on the determination(s) performed at 504, a charging map may be generated at 506. The charging map may indicate how many vehicles are coupled to the charging system and/or which charging ports included in the charging system are connected to vehicles. As discussed above, in some embodiments, the charging map may be embodied as a string of bits indicating which charging ports have connected vehicles, where asserted bits of the string of bits may indicate which charging ports are connected to vehicles.

At 508, one or more charging parameters may be calculated based on the charging map generated at 506. In certain embodiments, the charging parameters may be utilized by a charging control system and/or control electronics to control a switching mechanism. For example, in certain embodiments, a charging control system and/or control electronics may selectively actuate a plurality of switches, such that electrical power is provided to vehicles coupled to one or more charging ports associated with one or more of the switches based on the charging parameters. In certain embodiments, the charging parameters may include an actuation frequency, a duty cycle, and/or a phase of actuation of the switches.

In some embodiments, where the charging map is represented as a string of bits, certain charging parameters may be calculated based on the string of bits. For example, certain switching periods/frequencies may be determined based on the string of bits. In a charging system including three charging ports, exemplary charging map strings of bits may correspond to [1 1 1], [1 0 1], and [1 0 0], depending on how many vehicles are coupled to the charging ports and to which charging ports the vehicles are coupled. Based on these exemplary charging map strings of bits, switching frequencies/periods may be determined according to Table 1.

TABLE 1

| Charging Map | Switching Period |
| --- | --- |
| [1 1 1] | Period |
| [1 0 1] | 2*Period |
| [1 0 0] | 3*Period |

As show in Table 1, when more vehicles are coupled to the charging ports, the periods during which the respective switches are actuated to couple the vehicles to the charging power source may be shorter. When fewer vehicles are coupled to the charging ports (e.g., a charging map of [1 0 0]), the periods during which the respective switches are actuated to couple the vehicles to the charging power source may be longer.

In certain embodiments, a phase angle and/or a pulse width of charging signals provided to the vehicles by selectively actuating the switching mechanism may be calculated according to Equation 1:

$$\text{Phase Angle} = \frac{\text{Period}}{Bin2DecCon(\text{Charging Map})} \qquad \text{Equation 1}$$

$$\text{Pulse Width} = \frac{100}{Bin2DecCon(\text{Charging Map})}$$

where Bin2DecCon(Charging Map) is the decimal conversion of the charging map.

At 510, the switches may be actuated based on the calculated charging parameters. In certain embodiments, the switches may be actuated based on control signals provided to the switches by control electronics derived from the calculated charging parameters. By actuating the switches based on the calculated charging parameters, vehicles coupled to the charging system may be charged.

At 512, a determination may be made whether the charging map has been changed since its original calculation at 506. For example, if a vehicle has been coupled and/or uncoupled to the charging system since the original calculation of the charging map at 506, the charging map may require updating. Additionally, if a vehicle has been fully charged and does not require further charging, the charging map may be updated to reflect that the charging vehicle does not require further charging. If the charging map has been changed, the method may proceed to 506 and a new charging map may be calculated reflecting the changes. The method may proceed to 508, where new charging parameters may be calculated based on the new charging map, and 510, where the switching mechanism may be actuated according to the new charging parameters.

In certain embodiments, the systems and methods disclosed herein may be implemented, at least in part, using one or more computer systems. For example, certain features and functionality of the charging system, the charging control system, and the control electronics may be implemented using a computer system. The systems and methods disclosed herein are not inherently related to any particular computer or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. Certain features of the embodiments disclosed herein may be configured and/or combined in any suitable configuration or combination. Additionally, certain systems and/or methods disclosed herein may be utilized in battery systems not included in a vehicle (e.g., a backup power battery system or the like). It is noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, although the systems and methods disclosed herein are discussed in the context of charging multiple RESSs, similar embodiments may also be utilized to provide power (e.g., to a power grid) from multiple RESSs in a controlled manner. Various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A system for charging one or more rechargeable energy storage systems included in one or more vehicles comprising:
   a charging power source;
   a plurality of charging ports configured to interface with the one or more rechargeable energy storage systems of the one or more vehicles;
   a switching mechanism configured to selectively couple the charging power source to the plurality of charging ports; and
   a charging control system configured to:

generate a charging map indicating which charging ports of the plurality of charging ports are coupled to the one or more rechargeable energy storage systems,
determine one or more charging parameters based on the charging map, and
selectively actuate the switching mechanism based on the one or more charging parameters to provide electrical power from the charging power source to charging ports coupled to the one or more rechargeable energy storage systems,
wherein the one or more charging parameters comprise at least one of a charging frequency, a charging duty cycle, and a charging phase of the switching mechanism,
generate an updated charging map based on a detected change in the status of the plurality of charging ports indicating which charging ports of the plurality of charging ports have rechargeable energy storage systems coupled thereto,
determine one or more updated charging parameters based on the updated charging map and to selectively actuate the switching mechanism based on the one or more updated charging parameters to provide electrical power from the charging power source to the charging ports of the plurality of charging ports having rechargeable energy storage systems coupled thereto.

2. The system of claim 1, wherein the charging power source comprises a charging transformer.

3. The system of claim 1, wherein the switching mechanism comprises a plurality of switches, each switch of the plurality of switches being associated with a charging port and configured to selectively couple the charging power source to the associated charging port.

4. The system of claim 1, wherein the plurality of switches are configured to be selectively actuated based on one or more control signals generated by the charging control system.

5. The system of claim 1, wherein the plurality of charging ports are configured to interface with the one or more rechargeable energy storage systems using a receptacle included in a vehicle.

6. The system of claim 5, wherein the plurality of charging ports are configured to interface with the one or more rechargeable energy storage systems using a SAEJ1772 connector.

7. The system of claim 1, wherein the detected change comprises a change of the connectivity of the plurality of charging ports.

8. The system of claim 1, wherein the detected change comprises at least one of the one or more rechargeable energy storage systems reaching a charged state.

9. A method for charging one or more rechargeable energy storage systems included in one or more vehicles comprising:
receiving an indication that one or more charging ports of a plurality of charging ports included in a charging system have rechargeable energy storage systems of the one or more vehicles coupled thereto;
generating a charging map based on the indication;
determining one or more charging parameters based on the charging map; and
selectively actuating a switching mechanism included in the charging system based on the one or more charging parameters to provide electrical power from a charging power source to charging ports coupled to rechargeable energy storage systems,
wherein the one or more charging parameters comprise at least one of a charging frequency, a charging duty cycle, and a charging phase of the switching mechanism;
generating an updated charging map indicating which charging ports are coupled to rechargeable energy storage systems;
determining one or more updated charging parameters based on the updated charging map; and
selectively actuating the switching mechanism based on the one or more updated charging parameters to provide electrical power from a charging power source to charging ports that are coupled to rechargeable energy storage systems.

10. The method of claim 9, wherein selectively actuating the switching mechanism further comprises generating one or more control signals to selectively actuate the switching mechanism based on the one or more charging parameters to provide electrical power from a charging power source to charging ports coupled to the one or more rechargeable energy storage systems.

11. The method of claim 9, wherein the charging map comprises a string of bits and determining the one more charging parameters comprises determining the charging parameters based on the string of bits.

12. The method of claim 9, wherein selectively actuating the switching mechanism included in the charging system further comprises selectively actuating the switching mechanism included in a charging port of the charging system.

13. A non-transitory computer-readable storage medium comprising instructions that, when executed by a processor, cause the processor to:
receive an indication that one or more charging ports of a plurality of charging ports included in a charging system have rechargeable energy storage systems of the one or more vehicles coupled thereto;
generate a charging map based on the indication;
determine one or more charging parameters based on the charging map; and
generate one or more control signals configured to selectively actuate a switching mechanism included in the charging system based on the one or more charging parameters to provide electrical power from a charging power source to charging ports coupled to rechargeable energy storage systems,
wherein the one or more charging parameters comprise at least one of a charging frequency, a charging duty cycle, and a charging phase of the switching mechanism;
generate an updated charging map indicating which charging ports are coupled to rechargeable energy storage systems;
determine one or more updated charging parameters based on the updated charging map; and
selectively actuate the switching mechanism based on the one or more updated charging parameters to provide electrical power from a charging power source to charging ports that are coupled to rechargeable energy storage systems.

* * * * *